United States Patent
Anderson et al.

(10) Patent No.: US 7,366,100 B2
(45) Date of Patent: Apr. 29, 2008

(54) METHOD AND APPARATUS FOR MULTIPATH PROCESSING

(75) Inventors: Eric Anderson, Palo Alto, CA (US); Robert J. Schultz, Palo Alto, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 987 days.

(21) Appl. No.: 10/425,702

(22) Filed: Apr. 28, 2003

(65) Prior Publication Data

US 2003/0223424 A1    Dec. 4, 2003

Related U.S. Application Data

(60) Provisional application No. 60/385,867, filed on Jun. 4, 2002.

(51) Int. Cl.
*G01R 31/08*    (2006.01)

(52) U.S. Cl. .................................. 370/237; 370/395.31
(58) Field of Classification Search .................... None
See application file for complete search history.

(56) References Cited

U.S. PATENT DOCUMENTS

| | | | |
|---|---|---|---|
| 6,553,029 B1 * | 4/2003 | Alexander | 370/389 |
| 6,611,874 B1 | 8/2003 | Denecheau et al. | |
| 6,765,866 B1 * | 7/2004 | Wyatt | 370/229 |
| 6,778,495 B1 * | 8/2004 | Blair | 370/230 |

\* cited by examiner

*Primary Examiner*—Edan Orgad
*Assistant Examiner*—Jung Park (57) ABSTRACT

A multipath processing architecture that allows multipath packets to be distributed across multiple paths using a hash function and a modulo-arithmetic-based mapping function is disclosed. In one embodiment, the multipath processing architecture is implemented as part of a packet classification engine of a network node.

30 Claims, 6 Drawing Sheets

| Forwarding Index | MWV |
|---|---|
| 01 | 110000110001111 |
| 02 | 000000100001000 |
| ⋮ | ⋮ |

| Destination | Next Hop | No. of Hops | Cost |
|---|---|---|---|
| 192.68.253.2 | Router B - Port 0 | 2 | 2500 |
| 192.68.253.2 | Router C - Port 1 | 2 | 2500 |
| 192.68.253.5 | Router B - Port 0 | 2 | 2500 |
| 192.68.253.5 | Router C - Port 1 | 2 | 2500 |

| Forwarding Index | Path Index | Path Information |
|---|---|---|
| 01 | 0<br>1<br>2<br>3<br>⋮ | <Port 0><br><Port 1><br><Port 4><br><Port 15><br>⋮ |
| 02 | 0<br>1<br>2<br>3<br>4<br>⋮ | <Port 11><br><Port 9><br><Port 3><br><Port 0><br><Port 4><br>⋮ |

| Source Address | Destination Address | Forwarding Index |
|---|---|---|
| 192.168.232 | 192.68.123 | 01 |
| 192.168.232 | 192.253.254 | 02 |
| 192.168.232 | 192.225.128 | 03 |
| 192.31.1 | 161.041.282 | 04 |
| ⋮ | ⋮ | ⋮ |

FIG. 6  130

| Forwarding Index | MWV |
|---|---|
| 01 | 11000011000011111 |
| 02 | 0000001000001000 |
| ⋮ | ⋮ |

METHOD AND APPARATUS FOR MULTIPATH PROCESSING

CROSS-REFERENCE TO RELATED APPLICATION

This application is entitled to the benefit of provisional U.S. Patent Application Ser. No. 60/385,867, filed Jun. 4, 2002, which is incorporated herein by reference.

FIELD OF THE INVENTION

The invention relates generally to the field of networking and more specifically to a method and apparatus for processing multipath data packets.

BACKGROUND OF THE INVENTION

Multipath routing is a router feature that allows a stream of packets going to a given destination to be split across multiple paths. Routers that do not support multipath routing only remember a single path to any given destination. As a result, if a link failure occurs along that path, network traffic to that destination may be stopped completely. Conventional routers that support multipath routing, on the other hand, remember multiple paths to any given destination. In the event of a failure that impacts one of the paths in a multipath arrangement, traffic can be shunted over to the surviving paths, thus reducing the impact of link failures. Multipath routing also allows the routers to balance traffic loads across multiple paths.

Figure 1:
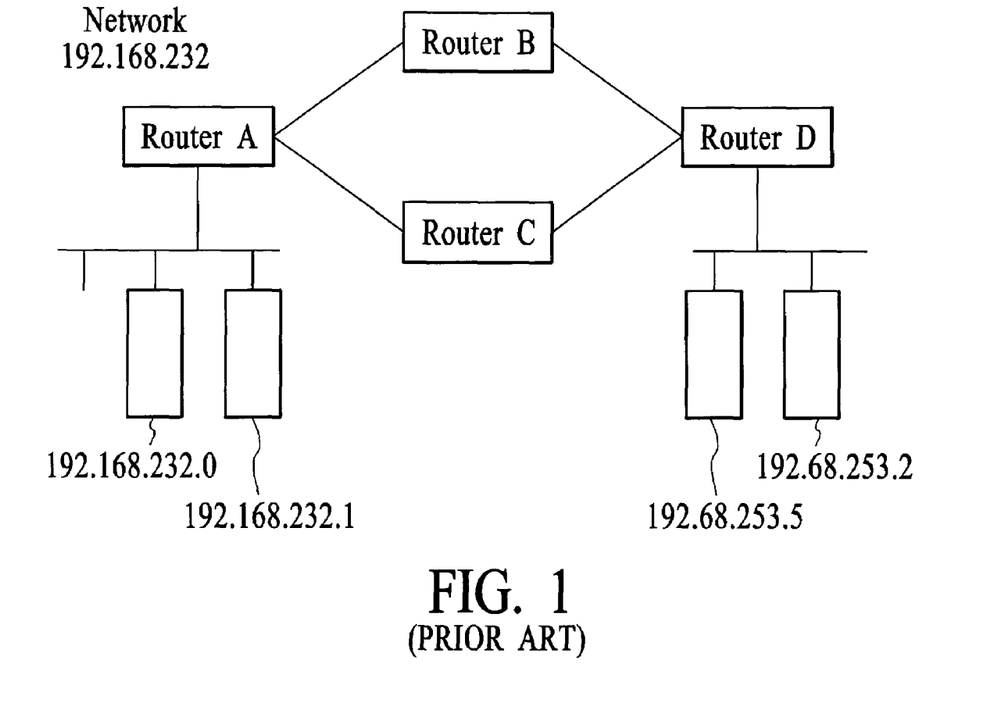
FIG. 1 depicts a small network where multipath routing is supported.
Figure 2:
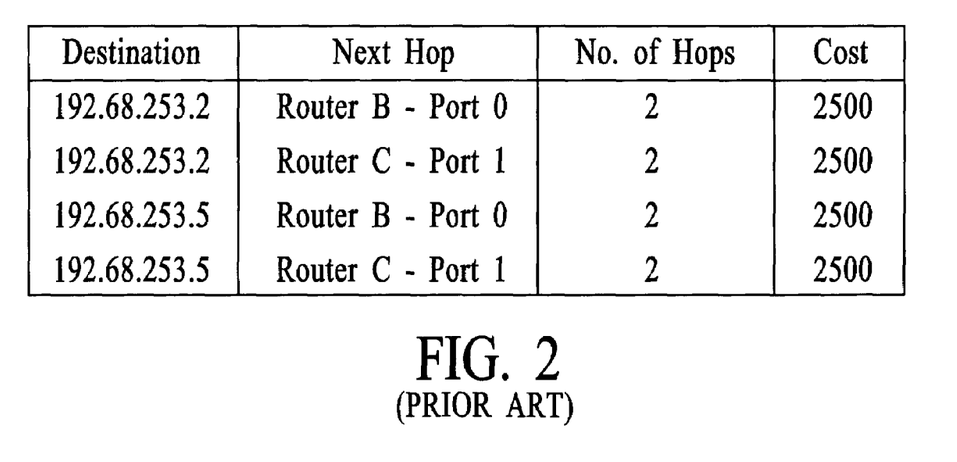
FIG. 2 depicts contents of Router A's routing table and shows the "cost" associated with each path.

FIG. 1 illustrates a small network where multipath routing is supported. As shown, Router A has one connection to Router B and one connection to Router C. Router B and Router C each have a connection to Router D. To reach Router D, data packets from Router A can be routed via Router B and Router C. FIG. 2 illustrates the contents of Router A's routing table and shows the "cost" associated with each path. If the two paths have the same cost, Router A is indifferent to either path and may split traffic equally between both paths. If the path via Router B and the path via Router C have unequal bandwidths or "costs," Router A may direct more traffic to the one connection with a lower cost than the one with a higher cost.

Multipath load balancing can be performed on a "per packet" basis or a "per destination" basis. Balancing multipath traffic on a per packet basis means that packets bound for the same destination are distributed to different interfaces. For example, with reference to FIGS. 1 and 2, Router A can route half of the data packets bound for destination IP address 192.68.253.5 via Router B and half of the data packets bound for the same destination IP address via Router C. Balancing traffic on a per-packet basis is typically not too resource intensive. However, some data may be received late, or out of sequence, which can cause application problems.

Multipath load balancing on a per destination basis means that packets bound for the same destination will be forwarded via the same path. For example, with reference to FIG. 1, Router A can route all data packets bound for destination IP address 192.68.253.5 via Router B while routing all data packets bound for destination IP address 192.68.253.2 via Router C. Balancing traffic on a per-destination basis alleviates some potential problems caused by per-packet load balancing. One drawback of balancing traffic on a per-destination basis, however, is that it is more resource intensive than load balancing on a per-packet basis.

A significant amount of memory is used in conventional routers to cache route information such that packets bound for the same destination can be routed via the same path. Another drawback is that it is difficult to control the percentage of traffic routed through a particular path.

In view of the foregoing, what is needed is a router that can handle multipath routing and load balancing in a resource-efficient manner. What is also needed is a method of handling multipath load balancing in a resource-efficient manner.

SUMMARY OF THE INVENTION

An embodiment of the invention is a multipath processing method that allows multipath packets to be distributed across multiple paths using a hash function and a modulo-arithmetic-based mapping function. In one embodiment, the multipath processing method is implemented as part of a packet classification engine of a network node.

The packet classification engine accesses a Multipath Weight Vector Table that includes a plurality of Multipath Weight Vectors. Each of the Multipath Weight Vectors is predefined by users and/or router software and is associated with an index. The Multipath Weight Vectors describe a number of available paths for routing multipath packets and the desired relative traffic distribution for each of the available paths. In one embodiment, the packet classification engine allows traffic to be partitioned in fractions of 1/M, where M represents a maximum number of available paths for a given destination. In that embodiment, the Multipath Weight Vectors are each M-bits wide.

The packet classification engine examines one or more fields of the header (e.g., destination address fields, source address fields) of a data packet to be routed. Using this information, the packet classification engine generates an index and retrieves a corresponding Multipath Weight Vector from the Multipath Weight Vector Table. The packet classification engine also generates a value representative of at least part of the header information. In one embodiment, the representative value is a hash value generated using a hash function and "non-random" header fields such as source and destination application port numbers, source and destination addresses and flow identifiers. The hash values thus generated will be the same for packets that share the same header information. In another embodiment, the representative value is generated using a hash function and "random" header fields such as the CRC field. In that embodiment, the resulting hash values will be random (or appear to be random) and will differ from one packet to another even if those packets share the same non-random header information. In yet another embodiment, the packet classification engine generates a random or pseudo-random value without regard to any fields of the data packet.

The packet classification engine also generates a path index based on the Multipath Weight Vector and the hash value. In one embodiment, a packet processor receives the path index and the forwarding index from the packet classification engine and uses the received information to select an appropriate one of the multiple paths for routing the data packet. In another embodiment, the packet processor receives values representative of other header information from the packet classification engine and uses these values with the path index to select an appropriate path for routing the data packet.

According to one embodiment, the packet classification engine determines a number of paths available for routing a packet and the desired relative traffic distribution for each available path solely from the Multipath Weight Vectors. In one embodiment, the number of "1" bits in a Multipath Weight Vector indicates the number of available paths configured for a given packet flow. The number of bit positions between a particular "1" bit and a closest less significant "1" bit divided by a weight denominator (which is the bit position of the most significant "1" bit plus one) indicates the desired relative traffic load for a path that is associated with that particular "1" bit.

In one embodiment, the Multipath Weight Vector Table is stored within an off-chip Static Random Access Memory (SRAM) that is accessible by the packet classification engine. Specific information of the available paths is stored in an off-chip Dynamic Random Access Memory (DRAM) that is accessible by the packet processor.

Other aspects and advantages of the present invention will become apparent from the following detailed description, taken in conjunction with the accompanying drawings, illustrating by way of example the principles of the invention.

DETAILED DESCRIPTION

Embodiments of the invention can be implemented within a network node that handles traffic in discrete units, often referred to as datagrams, data packets or packets. In one embodiment, the network node can be an Ethernet switch/router that forwards traffic using OSI (Open Systems Interconnect) Layer 2, Layer 3, and/or Layer 4 header information. The network node may have a distributed architecture. That is, the network node may include line cards that are coupled to each other via a switch matrix and each line card is partially responsible for processing and forwarding the datagrams. Furthermore, the network node supports network protocols such as Ethernet, ATM, and Frame Relay. Although embodiments of the invention can be implemented within an Ethernet-based switch/router with a distributed architecture, the invention can be implemented within network nodes with other types of architecture as well.

According to one embodiment of the invention, the network node is capable of performing hardware-based multipath load balancing. Multipath load balancing herein refers to a network node function that allows a packet stream to be split across multiple paths according to predetermined link-specific relative traffic loads. In this embodiment, the network node sorts incoming packets by predetermined header fields using a hash function, and directs the packets to a given link or port based on the value of that hash function, a modulo-based mapping function and link-specific relative traffic load information embedded in the Multipath Weight Vectors.

Figure 3:
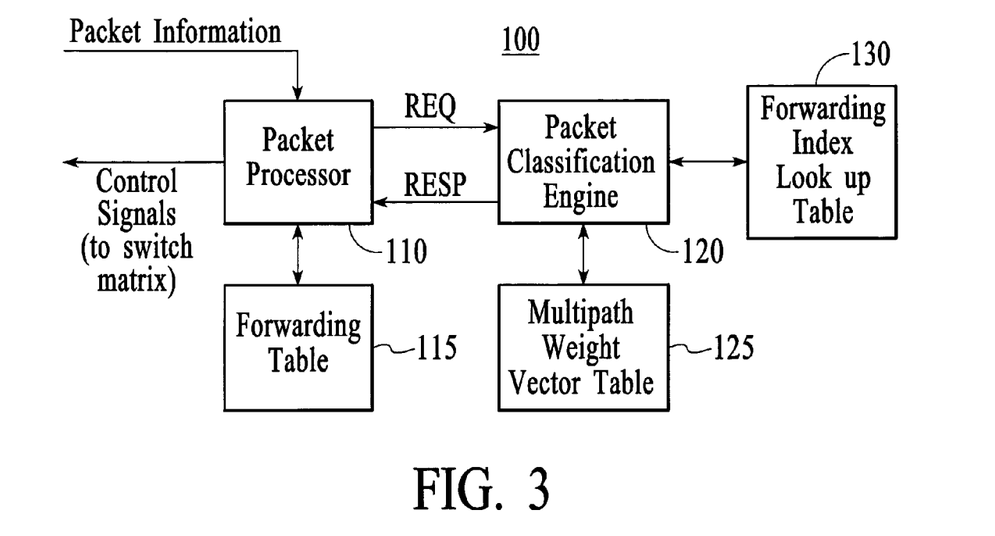
FIG. 3 is a block diagram illustrating a portion of a network node capable of multipath routing in accordance with an embodiment of the invention.

FIG. 3 is a block diagram illustrating a portion of a network node 100 capable of multipath routing in accordance with an embodiment of the invention. As shown, the network node 100 includes a Packet Processor 110 and a Packet Classification Engine 120. A main function of the Packet Classification Engine 120 is to classify the incoming packets, and a main function of the Packet Processor 110 is to decide where a packet is to be routed based on its classification. In this embodiment, the Packet Processor 110 is coupled to a Forwarding Table 115, which contains information for forwarding packets such as the port number to which packets matching certain criteria should be sent. The Packet Classification Engine 120 is coupled to a Forwarding Index Lookup Table 130, which contains Forwarding Indices, and a Multipath Weight Vector Table 125, which contains Multipath Weight Vectors. In one embodiment, the Multipath Weight Vector Table 125 is stored within an off-chip Static Random Access Memory (SRAM) that is accessible by the Packet Classification Engine 120. The Forwarding Table 115 is stored in an off-chip Dynamic Random Access Memory (DRAM) that is accessible by the Packet Processor 110. The Forwarding Index Lookup Table 130 is stored within a Content Addressable Memory that is accessible by the Packet Classification Engine 120. In one embodiment, the Packet Processor 110 and the Packet Classification Engine 120 are implemented as ASICs (Application Specific Integrated Circuits). In another embodiment, the Packet Processor 110 and the Packet Classification Engine 120 are implemented in the same ASIC.

In operation, when the network node receives a packet, the Packet Processor 110 reads its header information and transmits a request, or REQ message, containing relevant portions of the header information to the Packet Classification Engine 120. The Packet Classification Engine 120 then generates a Forwarding Index based on the received information and accesses a Multipath Weight Vector Table 125 to retrieve an appropriate Multipath Weight Vector. In one embodiment the Packet Classification Engine 120 uses the Multipath Weight Vector, as well as a hash function and a modulo-based function, to generate a Path Index. The Packet Classification Engine 120 then forms a response, or RESP message, with the Forwarding Index and the Path Index and sends RESP message to the Packet Processor 110. A more detailed description of how the Packet Classification Engine 120 generates the Forwarding Index and the Path Index is provided further below.

Upon receiving the RESP message, the Packet Processor 110 accesses the Forwarding Table 115 to retrieve forwarding information that corresponds to the RESP message's Forwarding Index and the Path Index. Using the retrieved Path Information, the Packet Processor 110 then generates control signals for a Switch Matrix (not shown) of the network node 100 to direct the packet to an interface (e.g., a port number) specified by the forwarding information.

Figure 4:
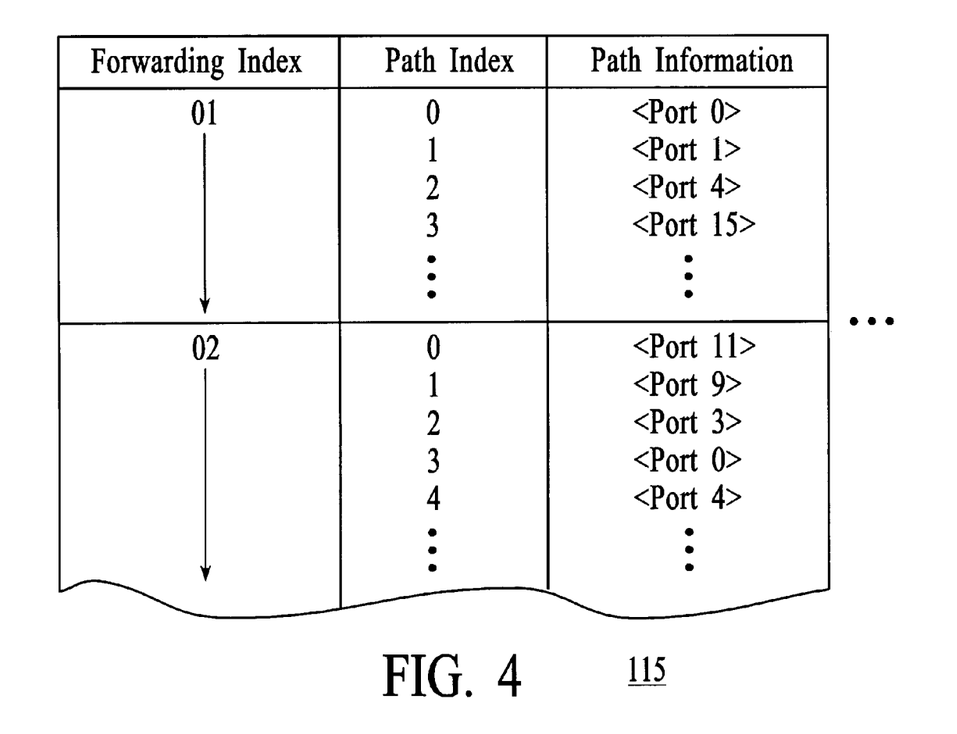
FIG. 4 depicts a portion of the Forwarding Table of the network node of FIG. 3 according to an embodiment of the present invention.

FIG. 4 depicts some contents of the Forwarding Table 115 according to an embodiment of the present invention. Each entry of the Forwarding Table 115 includes a Forwarding Index, a Path Index and a port number. The forwarding information contained in the Forwarding Table 115 indicates how a packet is to be routed. For instance, as shown in FIG. 4, if the Packet Classification Engine 120 generates a Forwarding Index "01" and a Path Index "3" using header information of a packet, the Packet Processor 110 will direct that packet to Port 15.

In one embodiment, the Forwarding Table 115 can be programmed with information specified by the user or network administrator. In some embodiments, contents of the Forwarding Table 115 can include information generated by software that dynamically calculates routes based on a current network status.

Figure 5:
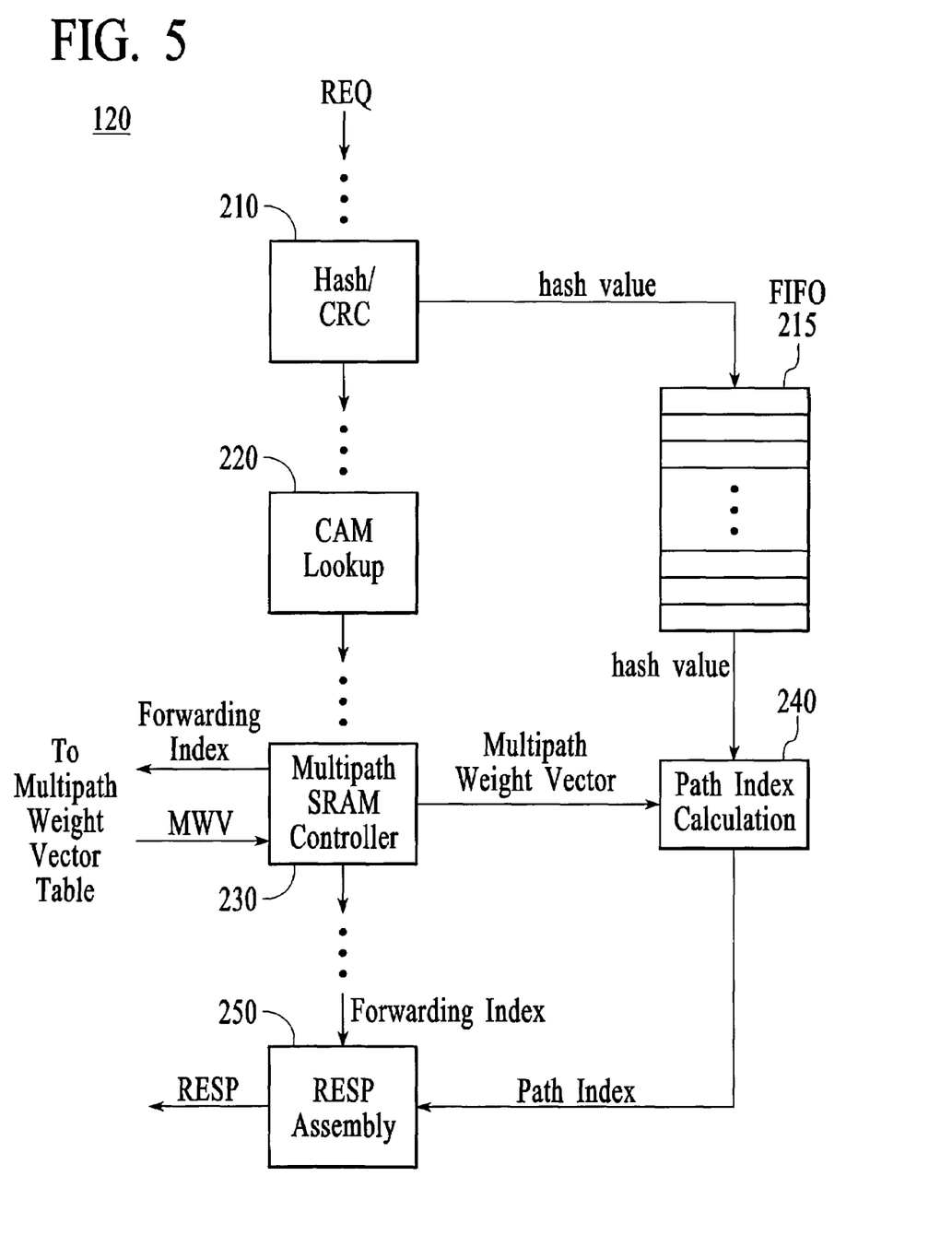
FIG. 5 is a block diagram depicting portions of the Packet Classification ASIC of FIG. 3 in accordance with an embodiment of the invention.

Attention now turns to the generation of Forwarding Indices and Path Indices by the Packet Classification Engine 120. FIG. 5 is a block diagram depicting portions of the Packet Classification Engine 120 in accordance with an embodiment of the present invention. In particular, the Packet Classification Engine 120 includes a HASH/CRC block 210, a CAM lookup block 220, a Multipath SRAM Controller 230, a Path Index Calculation block 240, a FIFO (First-in-first-out) buffer 215, and a RESP Assembly block 250. Various components shown in FIG. 5 do not necessarily represent circuit blocks of the Packet Classification Engine 120. Rather, the components shown in FIG. 5 represent functions performed by the Packet Classification Engine 120 and such functions can be accomplished through hardware, software and/or a combination of hardware and software.

With reference still to FIG. 5, when the Packet Classification Engine 120 receives a REQ message from the Packet Processor 110, the HASH/CRC block 210 examines one or more fields of the header information (e.g., destination address field, source address field, flow identifier, source application port number, destination application port number, CRC field) contained in the REQ message. Using this information and a predetermined hash function, the HASH/CRC block 210 generates a hash value and provides it to the FIFO 215. In the illustrated embodiment, the FIFO 215 is used because the Packet Classification Engine 120 may take extra clock cycles to retrieve a corresponding Multipath Weight Vector. Therefore, the FIFO 215 has a number of stages so that the hash value and the corresponding Multipath Weight Vector can be provided concurrently to the Path Index Calculation block 240.

In one embodiment, the HASH/CRC block 210 obtains a 32-bit CRC (Cyclic Redundancy Check) value from the header of the packet, and XOR's the upper and lower 16-bits together to provide a 16-bit hash value. It should be noted that other hash functions are used in other embodiments of the present invention.

Figure 6:
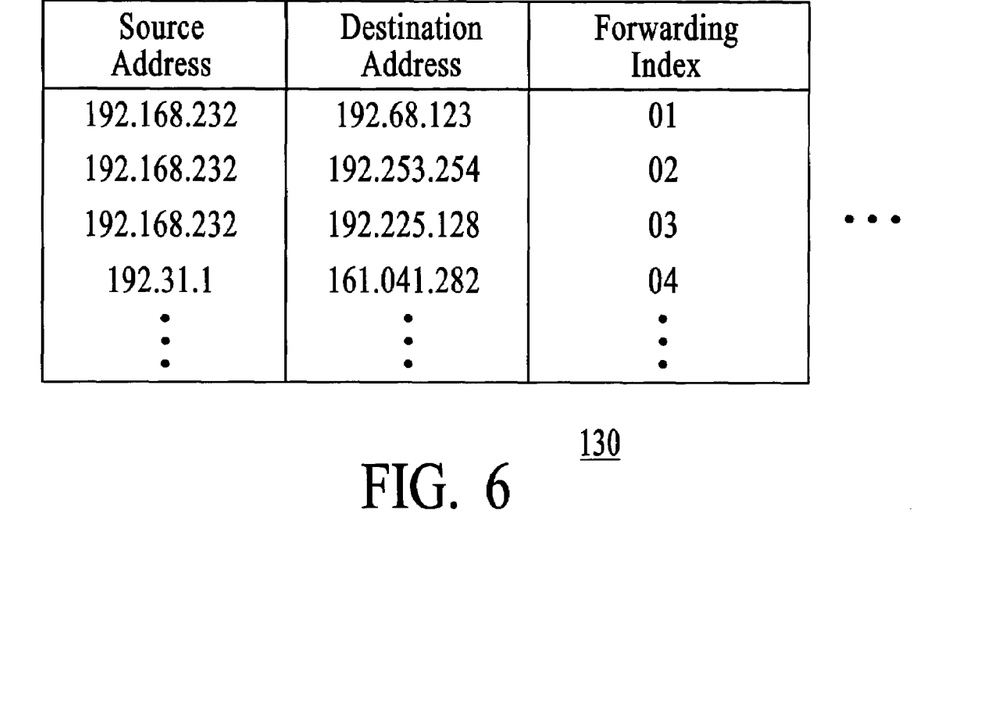
FIG. 6 depicts contents of the Content Addressable Memory of FIG. 3 according to an embodiment of the invention.

With reference still to FIG. 5, after the hash value is determined or concurrently with the generation of the hash value, the CAM lookup block 220 uses one or more fields of the header information (e.g., destination address field, source address field) contained in the REQ message to perform a look up on the Forwarding Index Lookup Table 130 and to retrieve a corresponding Forwarding Index. Some contents of the Forwarding Index Lookup Table 130 according to an embodiment of the invention are shown in FIG. 6. In this embodiment, each Forwarding Index is associated with a source address and a destination address. In other embodiments, each Forwarding Index can be associated with these and/or other fields. The contents of the Forwarding Index Lookup Table 130 can be programmed information specified by the user or network administrator. In some embodiments, contents of the Forwarding Index Lookup Table 130 can include information generated by software that dynamically calculates routes based on a current network status.

Figure 7:
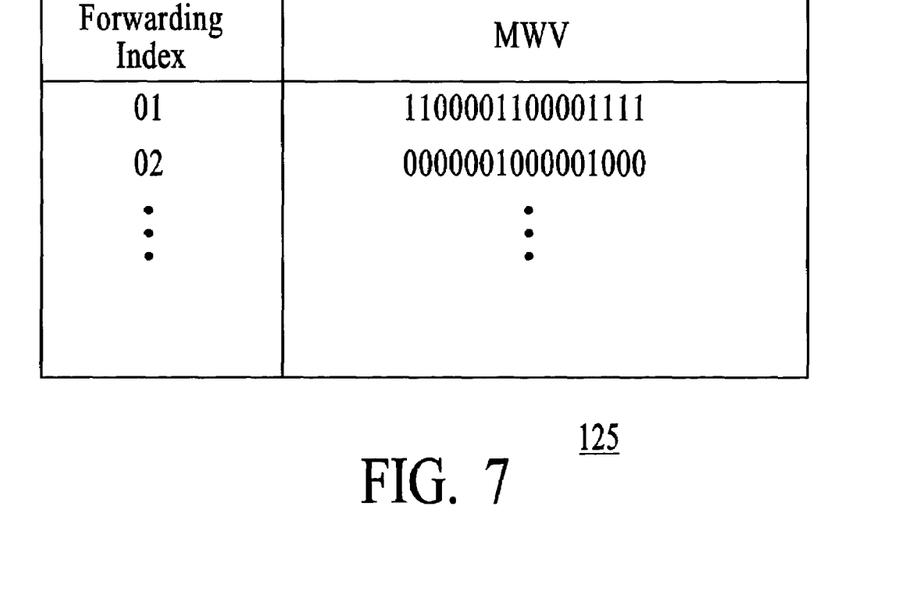
FIG. 7 depicts contents of the Multiple Weight Vector Table of FIG. 3 according to an embodiment of the invention.

With reference again to FIG. 5, the Forwarding Index retrieved by the CAM lookup block 220 is used by the Multipath SRAM Controller 230 to retrieve a Multipath Weight Vector from the Multipath Weight Vector Table 125. Contents of the Multiple Weight Vector Table 125 according to an embodiment of the invention are shown in FIG. 7. In the embodiment of FIG. 7, each Forwarding Index is associated with a Multiple Weight Vector. In one embodiment, the Packet Classification Engine 120 allows traffic to be partitioned in fractions of 1/M, where M represents a maximum number of available paths for a given destination. In this embodiment, the Multipath Weight Vectors are each M-bits wide. In one particular implementation, M equals sixteen and the Multipath Weight Vectors are each 16-bits wide. The Multipath Weight Vectors stored in the Multipath Weight Vector Table 125 can be predefined by users and/or generated automatically by software running on the network node.

According to the present embodiment, the Multipath Weight Vectors of the invention describe a number of available paths for routing data packets that are bound for the same destination and the desired relative traffic distribution for each of the available paths. In one embodiment, the number of "1" bits in a Multipath Weight Vector indicates the number of available paths configured for a given packet flow. The number of bit positions between a particular "1" bit and a closest less significant "1" bit divided by a weight denominator indicates the desired relative traffic load for a path that is associated with that particular "1" bit. The weight denominator, in this embodiment, is the bit position of the most significant "1" bit plus one.

Note that in the embodiment described above, the Multipath Weight Vectors use "1" bits as "on" bits to indicate the number of available paths and the desired relative traffic distribution. In another embodiment, the Multipath Weight Vectors use a different notation to describe the number of available paths and the desired relative traffic distribution. In that embodiment, the "0" bits are used as "on" bits. That is, the number of "0" bits indicates the number of available paths configured for a given packet flow, and the number of bit positions between a particular "0" bit and a closest less significant "0" bit divided by a weight denominator indicates a desired relative traffic load for a path. In some other embodiments, the Multipath Weight Vectors may use some other encoding schemes to indicate the number of available paths and the desired relative traffic distribution.

An example illustrating how a Multipath Weight Vector describes the number of available paths and the desired relative traffic load is as follows. Suppose there is a Multipath Weight Vector 0000_0000_1001_0100. Since there are three "1" bits in the vector, there are three available paths for routing a data packet to the same destination. Further, the bit position of the most significant "1" bit of the vector is "7". Thus, the weight denominator of the vector is "8". Additionally, since the difference between the bit positions of the most significant "1" bit and the second most significant "1" bit is three, approximately ⅜ of the traffic should be directed to one of the available paths. The difference between the bit positions of the second most significant "1" bit and the third most significant "1" bit is two. Thus, approximately ⅖ of the traffic should be directed to a second one of the available paths. Finally, the remaining approximately ⅜ of the traffic should be directed to the third one of the available paths.

Some additional examples illustrating how a Multipath Weight Vector describes the number of available paths to a given destination and the relative traffic load of each path are given in Table 1 below. Table 1

TABLE 1

| Multipath Weight Vector | Desired Relative Traffic Load |
|---|---|
| 0000_0001_0000_0001 | 1/9, 8/9 (Path #0 listed first) |
| 0000_1000_1000_1000 | 1/3, 1/3, 1/3 |
| 0000_0000_0000_0111 | 1/3, 1/3, 1/3 |
| 1000_0000_1000_0000 | 1/2, 1/2 |
| 0000_1100_1101_0110 | 2/12, 1/12, 2/12, 2/12, 1/12, 3/12, 1/12 |
| 0000_0111_1111_1111 | 1/11, 1/11, 1/11, 1/11, ... |

Note that the Multipath Weight Vectors of the invention are compact. As shown in the examples above, a vector merely 16-bits long can completely describe the number of paths available for a given destination and the desired relative traffic load for each of the path. An efficient implementation of multipath load balancing without consuming a significant amount of memory and hardware resources is therefore possible with the use of the Multipath Weight Vector format of the invention.

With reference again to FIG. 5, the Multipath SRAM Controller 230 retrieves a Multipath Weight Vector according to the information generated by the CAM lookup block 220, and sends the retrieved Multipath Weight Vector to the Path Index Calculation block 240. Recall that the Path Index Calculation block 240 also receives from the FIFO 215 a hash value generated by the HASH/CRC block 210. The Path Index Calculation block 240 uses the Multipath Weight Vector and the hash value to generate a Path Index, which the Path Index Calculation block 240 sends to the RESP Assembly block 250. The RESP Assembly block 250, which also receives the Forwarding Index from the Multipath SRAM Controller 230, combines the Forwarding Index and the Path Index to generate a RESP message. The RESP Assembly 250 then sends the RESP message back to the Packet Processor 110.

Recall that the Packet Processor 110, when given a RESP message including a Forwarding Index and a Path Index, will be able to retrieve appropriate forwarding information, such as a port number to which the packet should be sent, from the Forwarding Table 115.

Figure 8:
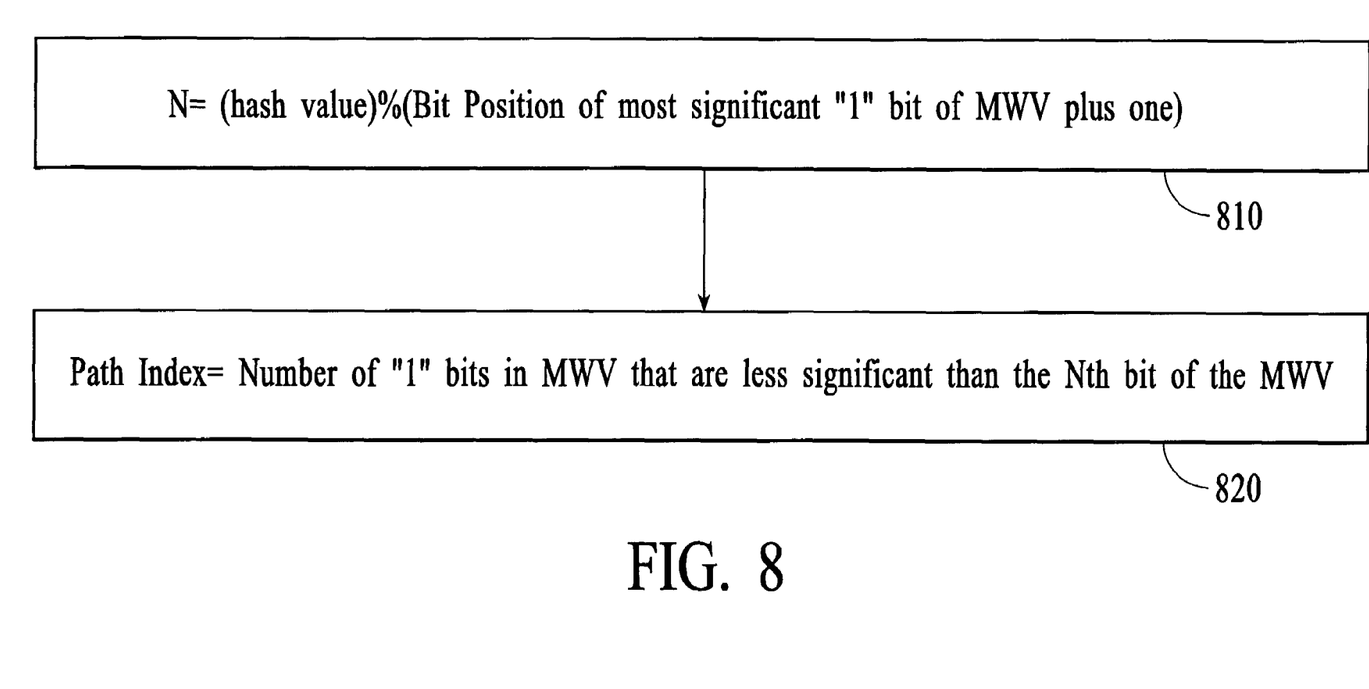
FIG. 8 is a flow diagram depicting the process of generating a Path Index according to an embodiment of the invention.

Referring now to FIG. 8, there is shown a flow diagram for a process of generating a Path Index in accordance with an embodiment of the invention. At step 810, a value N, which is the modulo of the hash value (generated by HASH/CRC block 210) and a Weight Denominator of the Multipath Weight Vector (retrieved by Multipath SRAM Controller 230). The Weight Denominator, in this embodiment, is the bit position of the most significant "1" bit of the Multipath Weight Vector plus one.

At step 820 of FIG. 8, the Path Index is determined by counting the number of "1" bits in the Multipath Weight Vector that are less significant than the N-th bit of the Multipath Weight Vector.

The following example illustrates the process shown in FIG. 8. Suppose a hash value for a packet is 0000_0000_0110_1101 (109 in decimal), and suppose a corresponding Multipath Weight Vector is 0000_0000_1001_0100. The Weight Denominator of this Multipath Weight Vector is "8", and the modulo N is 109 mod 8, or 5. The number of "1" bits that are less significant than the 5th least significant bit of the Multipath Weight Vector is two. The Path Index for this hash value and Multipath Weight Vector therefore also equals two. In this embodiment, a modulo-based mapping function is used to generate a Path Index because modulo logic is simple to implement in hardware and does not incur significant hardware overhead. In other embodiments, modulo arithmetic and/or other types of mathematical or algorithmic functions can be used to map the hash values to appropriate ones of the available paths.

The following example illustrates how a random hash value affects the generation of the Path Index. Suppose the Multipath Weight Vector is 0000_0000_1001_0100, and suppose the HASH/CRC block 210 uses header fields containing random or pseudo-random values. The resulting hash values will vary randomly (or pseudo-randomly) from packet to packet even if the packets are bound for the same destination. Consequently the modulo values will vary randomly (or pseudo-randomly) from 0 to 7. Under the process outlined in FIG. 8, modulo values 5, 6, 7 map the Path Index "2", modulo values 3 and 4 map to Path Index "1", and modulo values 0, 1 and 2 map to Path Index "0". That is, given a large enough number of samples, three times out of eight the Path Index will be "2", two times out of eight the Path Index will be "1", and three times out of eight the Path Index will be "0". As a result, traffic is load-balanced according to the relative traffic load information embedded within the Multipath Weight Vector.

In other embodiments where the HASH/CRC block 210 uses header fields containing non-random values (e.g., destination address fields, flow identifiers and application port numbers), the resulting hash values will likely be the same if the packets are bound for the same destination or share common attributes. In these embodiments, load balancing can be achieved when an appropriate Multipath Weight Vector with a desired relative traffic load profile matching the profile of the packet stream is used.

Figure 9:
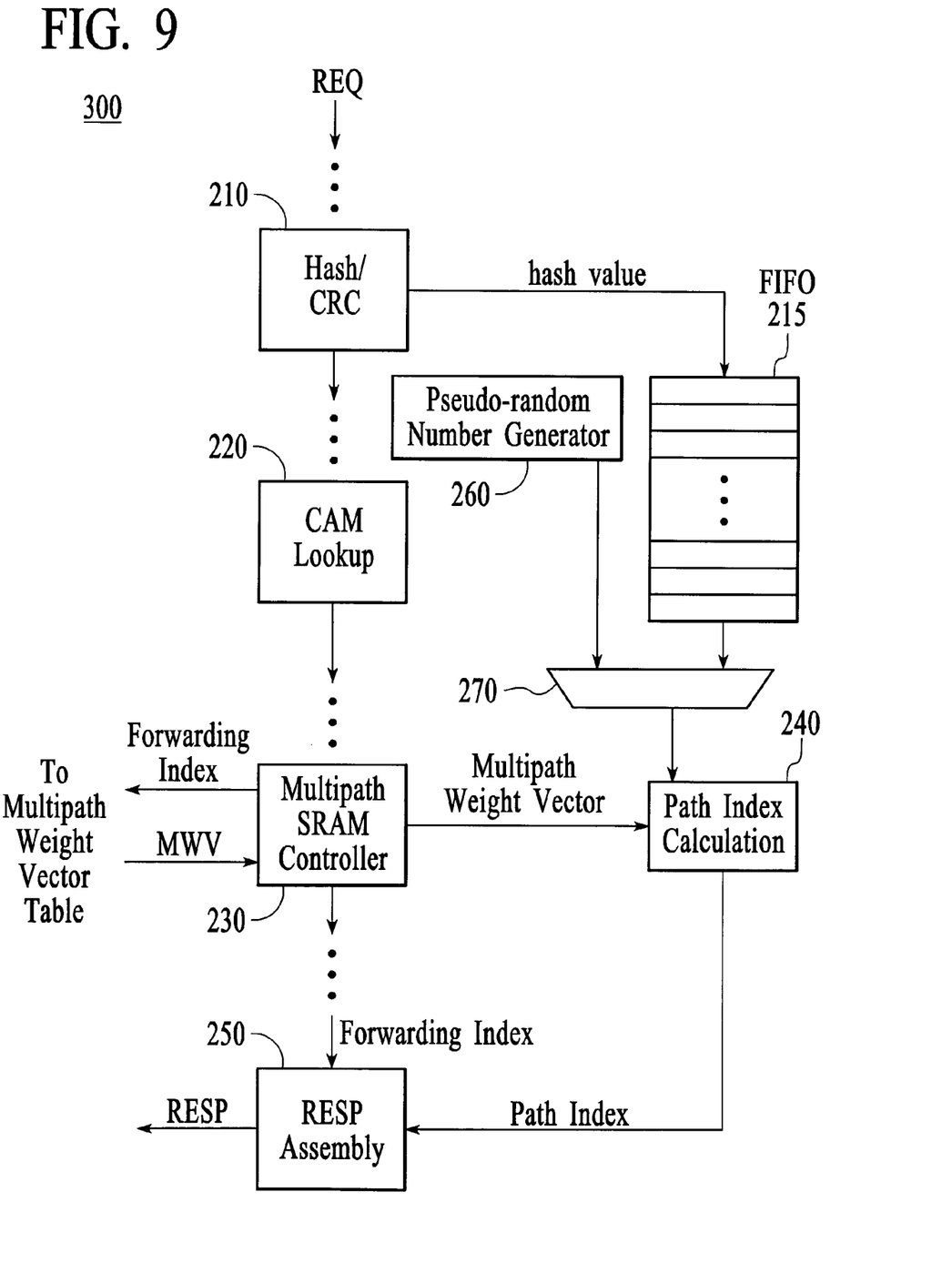
FIG. 9 depicts an implementation of the Packet Classification Engine of FIG. 4 in accordance with another embodiment of the invention.

FIG. 9 illustrates portions of a Packet Classification Engine 300 according to another embodiment of the invention where the Path Index can be generated based on a random or pseudo-random value that is not derived from a data packet header. As shown, the Packet Classification Engine 300 includes a Pseudo-Random Number Generator 260 and multiplexer 270. The multiplexer 270 receives a pseudo-random number from the Pseudo-Random Number Generator 260 or a hash value from FIFO 215 according to a control signal. Upon receiving appropriate control signals, the multiplexer 270 can select the outputs from the Pseudo-Random Number Generator 260 or the outputs from the HASH/CRC block 210. When the outputs of the Pseudo-Random Number Generator 260 are selected, the Path Index Calculation block 240 will use a pseudo-random number and a Multipath Weight Vector to generate the Path Index. The Path Index thus generated will therefore vary randomly (or pseudo-randomly) within the range prescribed by the Multipath Weight Vector. When the multiplexer 270 selects outputs from the HASH/CRC block 210 and the FIFO 215, the Path Index Calculation block 240 will use the hash value and a Multipath Weight Vector to generate the Path Index.

In another embodiment, a true random number generator, such as one that samples and processes an external entropy source, is used for generating truly random values. However, because a true random number generator is difficult to implement, a pseudo-random number generator is preferred.

It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method of routing data packets, comprising:
   receiving a header associated with a data packet;
   searching a table with a first value representative of one or more fields of the header to retrieve a multipath weight vector stored therein, wherein the multipath weight vector describes a plurality of available paths for the data packet and a relative traffic distribution for each of the available paths;
   obtaining a second value representative of one or more fields of the header; and
   selecting one of the available paths for routing the data packet based on at least in part the second value and the multipath weight vector, wherein the selecting step comprises:
      determining a bit position of the most significant "on" bit of the multipath weight vector;
      determining a modulo value from the hash value and the determined bit position;
      producing a path index from the multipath weight vector and the modulo value.

2. The method of claim 1, wherein the first value represents at least part of OSI layer 3 information of the header.

3. The method of claim 1, wherein the second value comprises a hash value representative of at least part of OSI layer 4 information of the header.

4. The method of claim 1, wherein the second value comprises a hash value representative of at least a CRC field of the header.

5. The method of claim 1, wherein the table comprises a plurality of entries having stored therein a plurality of multipath weight vectors.

6. The method of claim 1, wherein the producing step comprises counting a number of "on"-bits of the multipath weight vector that are less significant than the N-th bit position of the multipath weight vector where N equals the modulo value.

7. A method of routing data packets, comprising:
   receiving a header associated with a data packet;
   searching a table with a first value representative of one or more fields of the header to retrieve a multipath weight vector stored therein, wherein the multipath weight vector describes a plurality of available paths for the data packet and a relative traffic distribution for each of the available paths;
   generating a second value independently of contents of the header; and
   selecting one of the available paths for routing the data packet based on at least in part the second value and the multipath weight vector, wherein the selecting step comprises:
      determining a bit position of the most significant "on" bit of the multipath weight vector;
      determining a modulo value from the second value and the determined bit position;
      producing a path index from the multipath weight vector and the modulo value.

8. The method of claim 7, wherein the first value represents at least part of OSI layer 3 information of the header.

9. The method of claim 7, wherein the table comprises a plurality of entries having stored therein a plurality of multipath weight vectors.

10. The method of claim 7, wherein the producing step comprises counting a number of "on"-bits of the multipath weight vector that are less significant than the N-th bit position of the multipath weight vector where N equals the modulo value.

11. A network node, comprising:
    means for receiving a header associated with a data packet;
    means for obtaining first information from one or more fields of the header;
    means for searching a table with a value representative of the first information to retrieve a multipath weight vector stored therein, wherein the multipath weight vector describes a plurality of available paths for the data packet and a relative traffic distribution for each of the available paths;
    means for obtaining second information from one or more fields of the header;
    means for hashing the second information to generate a hash value; and
    means for selecting one of the available paths for routing the data packet based on at least in part the hash value and the multipath weight vector, wherein the means for selecting comprises
       means for determining a bit position of the most significant "on" bit of the multipath weight vector;
       means for determining a modulo value from the hash value and the determined bit position;
       means for producing a path index from the multipath weight vector and the modulo value.

12. The network node of claim 11, wherein the first information comprises OSI layer 3 information.

13. The network node of claim 11, wherein the second information comprises OSI layer 4 information.

14. The network node of claim 11, wherein the second information comprises a CRC field of the data packet.

15. The network node of claim 11, wherein the table comprises a plurality of entries having stored therein a plurality of multipath weight vectors.

16. The network node of claim 11, wherein the path index corresponds to a number of "on"-bits of the multipath weight vector that are less significant than the N-th bit position of the multipath weight vector where N equals the modulo value.

17. A router of data packets, comprising:
    means for receiving a header associated with a data packet;
    means for obtaining header information from one or more fields of the header;
    means for searching a table with a first value representative of the header information to retrieve a multipath weight vector stored therein, wherein the multipath weight vector describes a plurality of available paths for the data packet and a relative traffic distribution for each of the available paths;
    means for generating a second value independently of the header information; and
    means for selecting one of the available paths for routing the data packet based on at least in part the second value and the multipath weight vector, wherein the means for selecting comprises:
       means for determining a bit position of the most significant "on" bit of the multipath weight vector;
       means for determining a modulo value from the second value and the determined bit position;
       means for producing a path index from the multipath weight vector and the modulo value.

18. The network node of claim 17, wherein the header information comprises OSI layer 3 information.

19. The network node of claim 17, wherein the table comprises a plurality of entries having stored therein a plurality of multipath weight vectors.

20. The network node of claim 17, wherein the path index corresponds to a number of "on"-bits of the multipath weight vector that are less significant than the N-th bit position of the multipath weight vector where N equals the modulo value.

21. A packet classification engine, comprising:
an input to receive header information associated with a data packet;
hash function logic configured to use at least part of the header information to generate a hash value;
a memory lookup logic configured to search a table with a value representative of at least part of the header information to retrieve a multipath weight vector stored therein, wherein the multipath weight vector describes a plurality of available paths for the data packet and a relative traffic distribution for each of the available paths; and
a path index calculation logic configured to produce a path index based on at least in part the hash value and the multipath weight vector, wherein the path index indicates one of the available paths for routing the data packet, wherein path index calculation logic comprises:
logic to determine a bit position of the most significant "on" bit of the multipath weight vector;
logic to determine a modulo value from the hash value and the determined bit position;
logic to produce a path index from the multipath weight vector and the modulo value.

22. The packet classification engine of claim 21, wherein the memory lookup logic uses a value representative of OSI layer 3 information contained in the header information to search the table.

23. The packet classification engine of claim 21, wherein the hash function logic uses a value representative of OSI layer 4 information contained in the header information to generate the hash value.

24. The packet classification engine of claim 21, wherein the hash function logic uses a value representative of CRC information contained in the header information to generate the hash value.

25. The packet classification engine of claim 21, wherein the table comprises a plurality of entries having stored therein a plurality of multipath weight vectors.

26. The packet classification engine of claim 21, wherein the path index corresponds to a number of "on"-bits of the multipath weight vector that are less significant than the N-th bit position of the multipath weight vector where N equals the modulo value.

27. A packet classification engine, comprising:
an input to receive header information associated with a data packet;
a memory lookup logic configured to search a table with a first value representative of at least part of the header information to retrieve a multipath weight vector stored therein, wherein the multipath weight vector describes a plurality of available paths for the data packet and a relative traffic distribution for each of the available paths;
a number generator configured to generate a second value independently of the header information; and
a path index calculation logic configured to produce a path index based on at least in part the second value and the multipath weight vector, wherein the path index indicates one of the available paths for routing the data packet, wherein path index calculation logic comprises:
logic to determine a bit position of the most significant "on" bit of the multipath weight vector
logic to determine a modulo value from the second value and the determined bit position;
logic to produce a path index from the multipath weight vector and the modulo value.

28. The packet classification engine of claim 27, wherein the memory lookup logic uses a value representative of OSI layer 3 information contained in the header information to search the table.

29. The packet classification engine of claim 27, wherein the table comprises a plurality of entries having stored therein a plurality of multipath weight vectors.

30. The packet classification engine of claim 27, wherein the path index corresponds to a number of "on"-bits of the multipath weight vector that are less significant than the N-th bit position of the multipath weight vector where N equals the modulo value.

* * * * *